(12) United States Patent
Rune et al.

(10) Patent No.: US 9,113,396 B2
(45) Date of Patent: Aug. 18, 2015

(54) TRANSFER OF ACCESS RESTRICTION INFORMATION BETWEEN A RADIO NETWORK NODE AND A USER EQUIPMENT

(75) Inventors: Johan Rune, Lidingö (SE); Erik Eriksson, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/983,976

(22) PCT Filed: Feb. 23, 2011

(86) PCT No.: PCT/SE2011/050205
§ 371 (c)(1),
(2), (4) Date: Aug. 6, 2013

(87) PCT Pub. No.: WO2012/115547
PCT Pub. Date: Aug. 30, 2012

(65) Prior Publication Data
US 2014/0004857 A1    Jan. 2, 2014

(51) Int. Cl.
*H04W 48/12* (2009.01)
*H04W 8/26* (2009.01)
*H04W 74/08* (2009.01)

(52) U.S. Cl.
CPC ............ *H04W 48/12* (2013.01); *H04W 8/26* (2013.01); *H04W 74/0833* (2013.01)

(58) Field of Classification Search
USPC ............. 455/434, 450, 452.1; 370/329, 335
See application file for complete search history.

(56) References Cited

U.S. PATENT DOCUMENTS

2011/0039568 A1   2/2011  Zhang et al.
2011/0292895 A1  12/2011  Wager et al.

FOREIGN PATENT DOCUMENTS

WO     2010057540 A1    5/2010

OTHER PUBLICATIONS

Unknown, Author, Contention Based Uplink Transmissions, R2-093812, 0812612009, Ericsson, ST-Ericsson, Aug. 26, 2009 3GPP TSG-RAN WG2 #66bis, Los Angeles, USA.
Unknown, Author, Latency Improvement Comparison, R2-094825, Aug. 26, 2009, Ericsson, ST-Ericsson, China Unicorn, 3GPP TSG-RAN WG2 #67, Shenzhen, China.
Unknown, Author, Details of Latency Reduction Alternatives, R2-096759, Aug. 26, 2010, Ericsson, 3GPP TSG-RAN WG2 #68, Jeju, Korea.
Unknown, Author, The Solution of the Contention Based Uplink Transmission, R2-102803, 2010, CATT, 3GPP TSG RAN WG2 Meeting #70, Montreal, Canada.

*Primary Examiner* — Sam Bhattacharya
(74) *Attorney, Agent, or Firm* — Murphy, Bilak & Homiller, PLLC (57) ABSTRACT

Methods in a radio network node (110) and a user equipment (120) as well as a radio network node (110) and a user equipment (120) for providing access restriction information about restricting access to a cell (C1), managed by the radio network node (110), for at least the user equipment (120) are provided. The radio network node (110) encodes a downlink control information message by using a user equipment identifier associated with the access restriction information. Next, the radio network node (110) sends the downlink control information message to the user equipment (120). Next, the user equipment (120) decodes the downlink control information message to obtain the user equipment identifier associated with the access restriction information.

34 Claims, 3 Drawing Sheets

TRANSFER OF ACCESS RESTRICTION INFORMATION BETWEEN A RADIO NETWORK NODE AND A USER EQUIPMENT

TECHNICAL FIELD

The present disclosure relates to the field of telecommunications, in particular to cellular radio communication systems. More particularly, the present disclosure relates to a method in a radio network node and a radio network node for providing access restriction information about restricting access to a cell managed by the radio network node. Furthermore, the present disclosure relates to a method in a user equipment and a user equipment for obtaining access restriction information about restricting access to a cell managed by a radio network node.

BACKGROUND

It is desired to control access to many existing cellular radio communication systems in order to more efficiently use radio resources available. By controlling the access, load on the communication systems may be controlled, i.e. a reduced number of users implies a reduced load. Since radio resource often is a limited resource, it may be desired to allow some users of the cellular radio communication system access at the expense of not allowing some other users access to the cellular system.

For a Long Term Evolution (LTE) system, one such known method is called Access Class Barring (ACB). The LTE system may comprise a user equipment (UE) and a radio base station, often referred to as eNodeB (abbreviated eNB). The UE is a member of an Access Class (AC), which is stored in the universal subscriber information module (USIM). It shall be noted that the UE may be a member of one or more Access Classes. The eNB may announce an ACB state in a cell, managed by the eNB, through system information (SI). The system information may be broadcast by the eNB. A System Information Block Type 2 (SIB 2) of the system information lists the state of each AC through an Access Class Barring Factor (ACBF) associated with each AC. The ACBF has a value between 0 and 1. When the UE receives an SI and finds an AC in the SI, the UE checks if the AC, found in the SI, corresponds to the AC stored in the USIM. If the ACs match, the UE generates a random value between 0 and 1. If the random value is lower than the ACBF of the AC, the UE considers the cell as barred. That is, the UE is not allowed to send an access request to the cell for a random time period with a mean value governed by the Access Class Barring Time (ACBT) parameter included in the SI, more specifically in SIB 2.

The SIB 2 of the SI is transmitted with a periodicity of 80 ms or more. This may cause the access restrictions to be too slowly updated. Furthermore, updates of the SI is restricted by certain rules, which limit the frequency with which updates may occur and how fast an update may occur after being triggered. These rules include the concept of modification period, whose length is configurable in the SI and may be as long as 41 seconds. In addition, with certain exceptions, such as Earthquake and Tsunami Warning System (ETWS) information, and Commercial Mobile Alert System (CMAS) information and certain regularly changing parameters, it is not allowed to update the SI more than 31 times in a 3 hour period.

In WO 2010/057540, there is disclosed a method for providing a contention based data transmission from user equipments. In general, contention based data transmission refers to a transmission mode where a wireless entity, e.g. a user equipment, transmits data without having a dedicated radio resource allocated for this transmission. Instead, a radio resource is used, which may also be used by other wireless entities. If two or more wireless entities simultaneously attempt to transmit data using the same radio resource, a collision occurs (i.e. the transmissions interfere with each other), which typically means that the receiver(s) of the transmissions cannot correctly receive all the transmissions and, in the worst case, fail(s) to correctly receive even one of them. Hence, in order to allow the receiver to correctly receive the data of an incorrectly received transmission, the sender has to retransmit the data. In line with this general description of contention based data transmission, WO 2010/057540 discloses how user equipments are adapted to transmit data using resource blocks allocated by a radio network for contention based data transmission. The radio network is adapted to allocate resource blocks to a dedicated one of the user equipments or to a plurality of user equipments, with the latter being used for contention based data transmission. The radio network node allocates at least one resource block, which will be referred to as a contention based resource in the paragraph following the next paragraph, that is not allocated to any dedicated user equipment, but to a first plurality of the user equipments. The allocation is signalled to the user equipments. A first user equipment of said plurality of user equipments obtains data for transmission and transmits it using said at least one resource block. When two or more user equipments of said plurality of user equipments attempt to transmit data at the same time a collision occurs, i.e. more than one user equipment attempt to access the contention based resource at the same time. A collision frequency may be measured to keep track of how often collisions occur. In this manner, contention based data transmission in the uplink is enabled without prior scheduling request and scheduling grant. As a result, delays in uplink transmission resulting from scheduling request and scheduling grant are reduced.

Such contention based data transmission may be useful in conjunction with machine-to-machine communication involving large numbers of Machine Type Communication (MTC) devices, because a MTC device may infrequently access the radio network to send small pieces of data, such as measurement data in case the MTC device is equipped with a temperature sensor or the like. The MTC device will therefore in such scenarios have an undesirably high signalling-to-user data volume ratio. This means that control signalling overhead is undesirably large. Moreover, the MTC device is typically power constrained, i.e. the MTC device may be powered by a battery which eventually will be drained from power. Thus, there is a need for reduced control signalling overhead and this may be achieved through the contention based data transmission described above.

Moreover, if load on the contention based resources increases, the collision frequency will also increase and will eventually become so high that its negative impact on system properties, such as throughput, access delay and resource efficiency, as well as increased overhead on the UEs' data transmissions due to retransmissions, outweighs the benefits of the contention based (CB) mode. As a countermeasure, the eNB may limit the number of access attempts using the CB resources. The ACB mechanism described above cannot be used for this purpose, because it restricts access to the entire cell, i.e. to all access resources in the cell rather than only the contention based resources. Therefore, it has been proposed to allow the eNB to associate an access probability with a CB resource. The access probability is announced in the SI or signalled to the UEs via radio resource control (RRC) signalling. For MTC devices it may not be a completely satisfying solution, since large and rather rapid load variations on the CB resources may often occur for MTC devices. A reason for this may be that many MTC devices may more or less synchronously be triggered to send an uplink (UL) data transmission. Such synchronization may result from, for example, when multiple sensors of respective MTC devices detect that alarms need to be transmitted as uplink transmissions, or when multiple sensors detect that a failure, or a sequence of related failures, has/have occurred and hence need to transmit notifications of the failure as uplink transmissions. As another example, groups of MTC devices running the same application with synchronized periodic reporting periods may also generate such synchronization of uplink data transmission.

Therefore, there is a need for an alternative or additional method of providing access restriction information to a user equipment, such as an MTC device, which allows the MTC device to consume less power and which may update the access restriction information more frequently than with present methods, such as Access Class Barring.

SUMMARY

An object is to provide a mechanism for providing access restriction information about restricting access to a cell, managed by a radio network node, such as an eNB or the like, for a user equipment.

According to an aspect, the object may be achieved by a method in a radio network node for providing access restriction information about restricting access to a cell, managed by the radio network node, for at least one user equipment served by the radio network node. The radio network node and said at least one user equipment are comprised in a radio communication system. The radio network node encodes a downlink control information message by using a user equipment identifier associated with the access restriction information. Next, the radio network node sends the downlink control information message to said at least one user equipment. In this manner, the access restriction information is provided to said at least one user equipment.

According to another aspect, the object may be achieved by a radio network node for providing access restriction information about restricting access to a cell, capable of being managed by the radio network node, for at least one user equipment servable by the radio network node. The radio network node comprises a processing circuit configured to encode a downlink control information message by using a user equipment identifier associated with the access restriction information. Moreover, the radio network node comprises a transmitter configured to send the downlink control information message to said at least one user equipment. Thus, the radio network node is capable of providing the access restriction information to said at least one user equipment.

According to a further aspect, the object may be achieved by a method in a user equipment for obtaining access restriction information about restricting access to a cell, managed by a radio network node, for the user equipment being served by the radio network node. The user equipment and the radio network node are comprised in a radio communication system. The user equipment receives a downlink control information message from the radio network node. Next, the user equipment decodes the downlink control information message to obtain a user equipment identifier associated with the access restriction information. In this manner, the user equipment obtains the access restriction information.

According to yet another aspect, the object may be achieved by a user equipment for obtaining access restriction information about restricting access to a cell, capable of being managed by a radio network node, for the user equipment servable by the radio network node. The user equipment comprises a receiver configured to receive a downlink control information message from the radio network node. Moreover, the user equipment comprises a processing circuit configured to decode the downlink control information message to obtain a user equipment identifier associated with the access restriction information. Thus, the user equipment is capable of obtaining the access restriction information.

The access restriction information may be indicative of a specific access restriction level to be used by the user equipment, that the user equipment shall increase or decrease its current access restriction level, a cell of the radio network node for which access restrictions is to be applied, a specific radio resource relating to the cell for which access restrictions is to be applied, a type of user equipment for which access restriction is to be applied, that one or more of the preceding items is/are indicated elsewhere, such as in the downlink control information, or a combination thereof.

The specific access restriction level may be indicative of probability that the user equipment is allowed to send an access request to the radio network node. Thus, as an example, if the access restriction level indicates a low probability, such as 0.1, then load on the radio network node may be decreased.

In some embodiments, the downlink control information (DCI) message is encoded by using a user equipment identifier associated to the access restriction information. The user equipment identifier may be a radio network temporary identifier (RNTI). By encoding the user equipment identifier into the downlink control information message, the user equipment identifier may be used as a means for providing the access restriction information to the user equipment. Then, the downlink control information message is sent to a user equipment. When the downlink control information message is received by the user equipment, the user equipment decodes the downlink control information message to obtain the access restriction information. In this manner, access restriction information is provided to the user equipment. The user equipment identifier, or user equipment identifiers, used for provision of access restriction information may be dedicated, or reserved, for this purpose.

In some embodiments, the user equipment now has obtained the certain access restriction level to be used when determining whether or not to send an access request to the radio network node.

In some embodiments, the user equipment may obtain the certain access restriction level by interpreting contents of the downlink control information message, i.e. the downlink control information. This will be further elaborated in the detailed description herein.

Embodiments disclosed herein provide means for adaptation of access restriction information to rapidly varying load on a radio communication system. For example, a sudden increase of the load may imply that a smaller number of user equipments are to be allowed to send access requests to the radio network node. Rapidly varying load may occur due to conditions such as synchronized, or semi-synchronized, access attempts from MTC devices or event-triggered peaks or merely a dynamic user/traffic environment.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Throughout the following description similar reference numerals have been used to denote similar network nodes, devices, elements, parts, items or features, when applicable. In the Figures, features that appear in some embodiments are indicated by dashed lines.

In order to facilitate understanding of embodiments disclosed herein, a brief description of how a downlink control information message is encoded according to prior art is provided in the following. It may here be noted that downlink control information is known from Third Generation Partnership Project (3GPP) terminology. According to prior art, downlink control information is used for providing downlink scheduling information, uplink scheduling information and power control information. Different formats of the downlink control information are used for each of the aforementioned pieces of information, i.e. the uplink/downlink scheduling information and the power control information. For example, a format referred to as "format 0" may be used for providing uplink scheduling information aka an uplink grant. An intended recipient, or recipients, of a DCI message is distinguished by use of an RNTI. The RNTI is encoded into a cyclic redundancy check value of the DCI message as explained below.

When a radio network node, such as an eNB of an LTE system, sends a downlink control information (DCI) message, it first encodes the DCI message according to the following steps. A first cyclic redundancy check (CRC) value on a payload of the DCI to be transmitted is calculated. Next, the first CRC value is appended to the payload, i.e. the downlink control information, such as power control information according to a specified format. Then, a RNTI is added, i.e. by means of bitwise modulo 2, to the first CRC value before the DCI message, comprising the first CRC value and the payload, is transmitted. A user equipment which receives the DCI message may use the following procedure to decode the DCI message. A second CRC value is calculated from the received payload. Then, the second CRC is subtracted from the first CRC, which is appended to the payload, comprised in the received DCI message. The result of the subtraction is, provided that no bit errors have slipped through, the encoded RNTI. The encoded RNTI may be compared with one or more RNTIs, which RNTIs the user equipment may be configured to search for.

Figure 1:
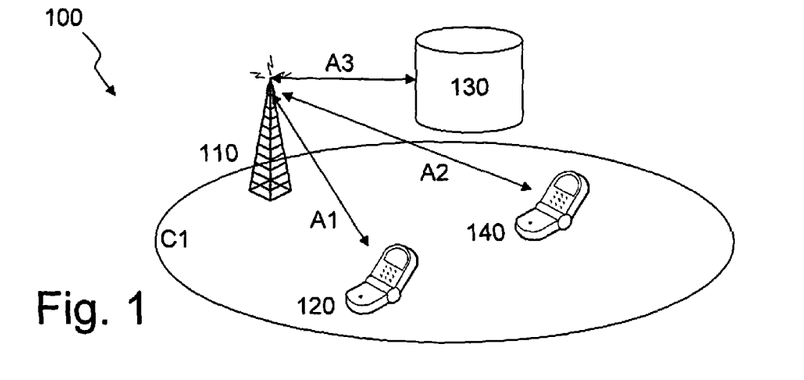
FIG. 1 shows a schematic overview of an exemplifying radio communication system in which an exemplifying method according embodiments herein may be implemented.

Now with reference to FIG. 1, there is shown a schematic overview of an exemplifying radio communication system 100, which in this example is a Long Term Evolution (LTE) system 100. The LTE system 100 comprises a radio network node 110, such as a radio base station, an eNB or the like, a first and a second user equipment 120, 140. Moreover, the LTE system may comprise a network node 130, such as an Operation and Maintenance (O&M) system, a Serving Gateway (SGW), a Mobility Management Entity (MME) or the like.

A first arrow A1 indicates that the first user equipment 120 is capable of communicating with the radio network node 110. A second arrow A2 indicates that the second user equipment 140 is capable of communicating with the radio network node 110. A third arrow A3 indicates that the radio network node 110 is capable of communicating with the network node 130.

As used herein, a user equipment may a mobile phone, a cellular phone, a Personal Digital Assistant (PDA) equipped with radio communication capabilities, a smartphone, a laptop equipped with an internal or external mobile broadband modem, a portable electronic radio communication device or the like.

Figure 2:
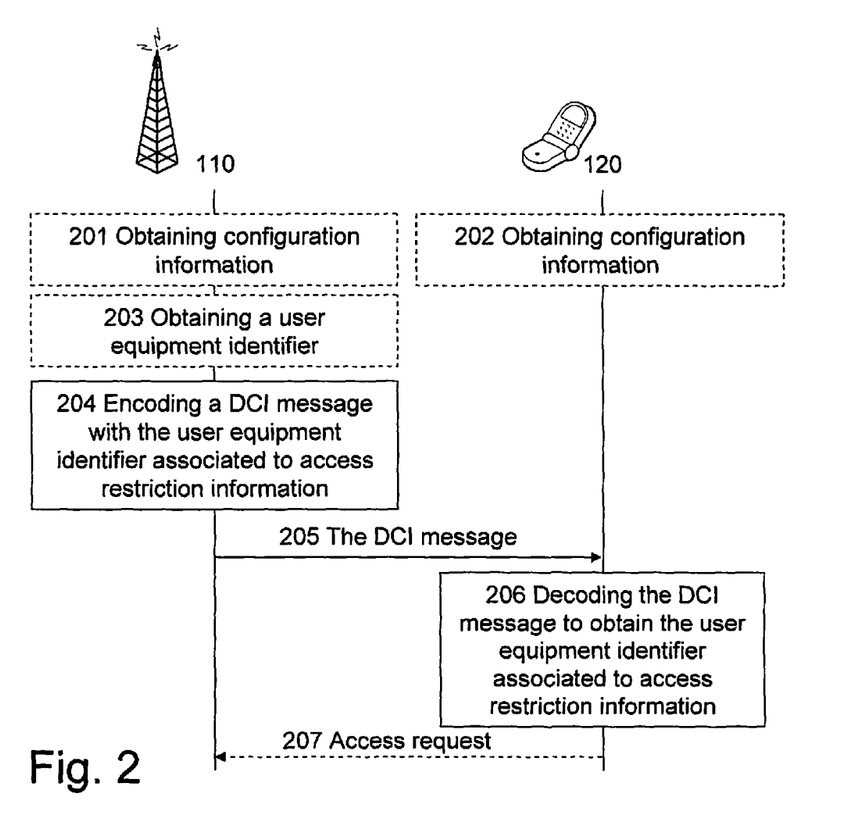
FIG. 2 shows a schematic, combined signalling and flow chart of an exemplifying method in the radio communication system according to FIG. 1.

Referring to FIG. 2, there is shown a schematic combined signalling and flow chart of an exemplifying method in the LTE system of FIG. 1. By use of the method illustrated in FIG. 2, the radio network node 110 provides access restriction information to at least one user equipment 120. The access restriction information is about restricting access to a cell C1, managed by the radio network node 110. The access to the cell C1 is restricted for said at least one user equipment 120, which is served by the radio network node 110. Said at least one user equipment 120 may be located in the cell C1, i.e. the user equipment 120 is served by the radio network node 110 via the cell C1. The radio network node 110 and said at least one user equipment 120 are comprised in the LTE system 100 of FIG. 1.

The following actions, such as steps, may be performed.

Action 201

In some embodiments, the radio network node 110 obtains configuration information about at least one user equipment identifier and the access restriction information associated therewith. For simplicity, said at least one user equipment identifier may be referred to as the user equipment identifier. In this manner, the radio network node 110 is informed about how the user equipment identifier is used for indication of access restriction information. Hence, when the radio network node 110 encodes access restriction information into a downlink control information message according to action 204 below, the radio network node 110 is aware of what and how the access restriction information is to be encoded in order to be correctly interpreted by the user equipment 110.

In some embodiments, the user equipment identifier is comprised in a set of user equipment identifiers. Each user equipment identifier of the set is associated with the access restriction information.

In some embodiments, the radio network node 110 obtains the configuration information by associating the user equipment identifier with the access restriction information. In this manner, the radio network node 110 may configure the user equipment identifiers when it finds it necessary.

In some embodiments, the radio network node 110 obtains the configuration information by receiving the configuration information from the network node 130. In some embodiments, the network node 130 providing the configuration information to the radio network node 110 is an entity for handling information about subscription of the user of the user equipment 120, about user equipment context and/or about mobility of the user equipment 120, e.g. a Mobility Management Entity (MME). In some embodiments, the network node 130 is an entity responsible for operation and maintenance (O&M) tasks, e.g. an O&M node such as an Operation Support System (OSS). In some embodiments, the network node 130 providing the configuration information to the radio network node 110 is an entity for handling user plane traffic, such as a Serving Gateway (SGW). Thus, the network node 130 may be e.g. an O&M node/system, MME or SGW.

In some embodiments, the configuration information comprises at least one of:
- an indication of at least one user equipment identifier of the set that is associated with the access restriction information, and
- the access restriction information for association with the user equipment identifier.

As an example, the configuration information provided by the radio network node 130 to the radio network node 110 may comprise both access restriction information and an indication of at least one user equipment identifier to be used when signalling of the access restriction information to at least one user equipment 120, 140 located in a cell managed by the radio network node.

Alternatively, the configuration information provided by the radio network node 130 to the radio network node 110 may comprise access restriction information, but no indication of at least one user equipment identifier. The radio network node 110 may obtain said at least one user equipment identifier from an internal storage or the radio network node 110 may determine said at least one user equipment identifier by itself. The user equipment identifiers stored in the internal storage may be predetermined as given by a standard specification, by selection of a manufacturer or the like. Said at least one user equipment identifier is to be used when signalling of the access restriction information to at least one user equipment 120, 140 located in a cell managed by the radio network node.

As yet another alternative, the configuration information may comprise the indication of at least one user equipment identifier, but no access restriction information, in which case the radio network node 110 obtains the access restriction information from an internal storage. The access restriction information stored in the internal storage may be predetermined, such as specified by a standard specification, specified by a manufacturer or the like.

As an example, the MME may provide the radio network node 110, such as an eNB, with the configuration information. The configuration information may be conveyed to the radio network node 110 when the S1-MME interface between the MME and the radio network node is established, possibly followed by subsequent updates when necessary. The S1-MME interface is known from 3GPP terminology. The configuration information from the MME may comprise one or more of the following items:
- One or more sets of dedicated user equipment identifiers to use in action 204 below.
- For each dedicated user equipment identifier, a respective mapping to an access restriction level.
- For each dedicated user equipment identifier, a respective load level that may trigger the radio network node 110 to use a respective dedicated user equipment identifier associated to the respective load level. As an example, a specific user equipment identifier may be associated to a specific load level. When the specific load level is indicated to, or detected by, the radio network node, the radio network node may choose to use the specific user equipment identifier when encoding the DCI. The specific user equipment identifier is as described earlier also associated to a specific access restriction level.
- An algorithm or parameters for an algorithm that the radio network node 110 may use to determine when to use the access restriction information and what access restriction information to use.

Alternatively, the user equipment identifier(s) to be reserved may be determined by the radio network node 110, while the network node, e.g. the MME, provides configuration information comprising one or more of the following items:
- One or more access restriction level that the radio network node 110 should be able to signal to at least one user equipment 120, 140 located in a cell managed by the radio network node 110.
- One or more load level that should trigger the radio network node 110 to signal an access restriction level to at least one user equipment 120, 140 located in a cell managed by the radio network node 110. This one or more load level may or may not be associated with a respective access restriction level provided by the network node 130.
- An algorithm or parameters for an algorithm that the radio network node 110 may use to determine when to use the access restriction information and what access restriction information to use.

The above items, i.e. the items of the two lists of what the configuration information may comprise, in particular the set(s) of dedicated user equipment identifiers, may be different for different cells served by the radio network node 110.

In some embodiments, the O&M system, such as an Operations and Support System (OSS), provides the configuration information for the user equipment identifiers to the radio network node 110. The configuration information provided by the O&M system may or may not comprise the user equipment identifier(s) to be dedicated, or reserved, for this purpose. In the latter case, the radio network node 110 may autonomously, i.e. without assistance from the O&M system, determine which user equipment identifiers to reserve, based on an internal algorithm.

Action 202

In some embodiments, the user equipment 120 obtains configuration information about the user equipment identifier and the associated access restriction information. The configuration information indicates at least one user equipment identifier of the set that is associated with the access restriction information.

In some embodiments, the obtaining comprises receiving the configuration information from the radio network node 110, which in turn may have determined the configuration information and/or may have received the configuration information as described above in conjunction with action 201.

The configuration information obtained by the user equipment 120 may be the same or similar configuration information as obtained by the radio network node 110. As an example, the configuration information for the user equipment 120, i.e. the configuration information obtained by the user equipment 120, may be a subset of the configuration information for the radio network node 110.

Action 203

In some embodiments, prior to using the user equipment identifier associated with access restriction information to encode the downlink control information message, the radio network node 110 obtains the user equipment identifier associated to the access restriction information. The obtained user equipment identifier may be one of the user equipment identifiers among the user equipment identifiers comprised in the set of user equipment identifiers. Expressed differently, a set of reserved, or dedicated, user equipment identifiers comprises the obtained user equipment identifier.

In some embodiments, the radio network node 110 obtains the user equipment identifier in that the radio network node 110 determines the user equipment identifier.

In some embodiments, the radio network node 110 determines the user equipment identifier in that the radio network node 110 determines the user equipment identifier based on load on the radio network node 110. The load may originate from transmissions between the user equipments 120, 140 and the radio network node 110. For example, when the load on the radio network node 110, exceeds a threshold value, which may be configurable or predetermined, the radio network node 110 may decide to restrict access to the cell by increasing the access restriction level for the entire cell, for specific radio resources or for specific types of user equipments as will be described below. Moreover, certain threshold values for the load may be associated to specific user equipment identifiers, either directly associated or associated via access restriction levels. Hence, for a certain load value, the radio network node 110 may determine a respective user equipment identifier.

In some embodiments, the radio network node 110 determines the user equipment identifier in that the radio network node 110 determines the user equipment identifier based on information received from the network node 130. The information may be related to the access restriction information as will be explained directly below.

In some embodiments, the network node 130 may be an MME. The information relating to the access restriction information may be information from which the radio network node 110 may derive the user equipment identifier to be applied. For example, the information relating to the access restriction information may be instructions to decrease load, i.e. access is to be further restricted. The instructions may be regarded as being load control instructions sent from the MME to the radio network node 110 via the S1-MME interface, which is known for 3GPP terminology. Therefore, as a further example, in order to reduce the load on the MME, the MME may instruct connected eNBs, being examples of the radio network node 110, to restrict the number of accesses, or reduce the access frequency. In this manner, access signalling towards the MME is in turn reduced.

When an MME is overloaded, or experiencing undesirably high load, it instructs by means of the information relating to the access restriction information one ore more of its connected eNBs to reduce the load in the cell. The information relating to the access restriction information, sent by the MME to the radio network node 110, may be of different types, such as one or more of the following:

An indication of the degree of high load/overload that the MME is experiencing. The eNB may translate this into a suitable access restriction level, such as an access allowance probability. Next, the user equipment identifier may be determined based on the access restriction level.

An indication of that the MME is experiencing high load or is overloaded without qualification of the degree of the condition. This triggers the eNB to restrict the load, but the access restriction level is left to the eNB to determine. As an example, if the MME provides a load value, the eNB may determine the access restriction level based on the load value.

An indication of which access restriction level the eNB should apply to user equipments in the cell C1.

When the radio network node 110 receives an indication of the above mentioned kind, it may determine the access restriction information and also which user equipment identifier to use when encoding the downlink control information message in action 204 below.

In some embodiments, the radio network node 110 obtains the user equipment identifier in that the radio network node 110 receives information related to the user equipment identifier, load levels or access restriction information from an SGW, which may be network node 130 in FIG. 1, via a S1-U interface. The S1-U interface is known from 3GPP terminology. This embodiment may be performed in addition to or instead of obtaining information from the MME as mentioned above. The information provided by the SGW to the radio network node may be the same or similar as described in the above example where the MME provides the information to the radio network node. The SGW may also send the information to the MME (instead of the radio network node), which in turn sends the same or similar information to the radio network node.

As an example, a load condition, such as detection of overload or undesirably high load, in an SGW connected to the MME, may trigger the MME, which may detect the load condition, to send the information relating to the access restriction information to at least the radio network node 110.

In some embodiments, the radio network node 110 obtains the user equipment identifier in that it receives the user equipment identifier from the network node 130.

Action 204

The radio network node 110 encodes a downlink control information message by using a user equipment identifier associated with the access restriction information. Expressed somewhat differently, the radio network node 110 encodes the downlink control information message with the user equipment identifier associated with the access restriction information.

As mentioned, the access restriction information may be indicative of a specific access restriction level to be used by the user equipment, that the user equipment shall increase or decrease its current access restriction level, a cell of the radio network node for which access restrictions is to be applied, a specific radio resource relating to the cell for which access restrictions is to be applied, a type of user equipment for which access restriction is to be applied, that one or more of the preceding items is/are indicated elsewhere, such as in the downlink control information, or a combination thereof. Said one or more of the preceding items may be referred to as "further access restriction information" herein. Examples and/or embodiments for some combinations will be presented in the following. Other examples and combinations may be possible.

In a first set of embodiments, the access restriction information is indicative of an access restriction level. In this manner, the user equipment 120 is able to restrict a sending of an access request to the radio network node 110 by means of the access restriction level. This is described in more detail in conjunction with action 206 below. As an example, the access restriction level may indicate an access restriction probability level to be used by the user equipment 110 when deciding whether or not to send an access request to the radio network node 110. Thus, each of a number of user equipment identifiers may be associated to a respective access restriction level. The access restriction level may be indicative of an access restriction probability level or an access allowance probability level. The access restriction probability level is equivalent to an access restriction probability value and the access allowance probability level is equivalent to an access allowance probability value. When an access restriction probability level is indicated, a probability for not sending an access request is indicated, whereas when an access allowance probability level is indicated, a probability for sending an access request is indicated.

As an example, a first user equipment identifier may be associated with a first access restriction probability level of 0.1, a second user equipment identifier may be associated with a second access restriction probability level of 0.2, a third user equipment identifier may be associated with a third access restriction probability level of 0.3 and so on up to an access restriction probability level of 1.

As another example, the access restriction level may be an access allowance probability, or more specifically an access allowance probability value. In contrast to the preceding example, the access allowance probability value indicates the probability for allowing an access request to be sent to the radio network node 110. Thus, as a consequence of definition, an access restriction level of one, i.e. 1, may indicate that the cell C1 is completely barred for access, e.g. when the access restriction level is realized as an access restriction probability level. In other cases, an access restriction level of one may indicate that no access restriction applies, e.g. when the access restriction level is realized as an access allowance probability level.

As another example relating to the first set of embodiments, the user equipment identifier, such as a RNTI, which is encoded in the DCI message on a physical downlink control channel (PDCCH), indicates a general access allowance probability in the cell, i.e. a certain access restriction level. The access restriction has a function that is similar to the ACBF of the ACB mechanism described in the background section. However, in this example the access restriction level relates to all user equipments 120, 130, not only to those of a certain access class (AC) as in the case of the ACB mechanism. An advantage of using a user equipment identifier, transmitted on for example the physical downlink control channel, as a bearer of access restriction information is that it is faster and more efficient than the ACB mechanism. According to a third set of embodiments, which are described further below, the access restriction information may be related to, i.e. applicable to, some selected user equipments, or type of user equipments.

A certain dedicated user equipment identifier, arbitrarily denoted L-RNTI, which could be standardized, preconfigured in the USIM or announced in the SI, could be used to indicate access allowance probability $P_0$. Then L-RNTI+1 would indicate access allowance probability $P_1$, L-RNTI+2 would indicate access allowance probability $P_2$ etc. If preconfiguration in the USIM is used, the information can only be used when accessing the home public land mobile network (HPLMN), but not when roaming in a visited public land mobile network (VPLMN).

For example, the following values could be associated with the access restriction levels, such as probability parameters:

$$P_0 = 1 - \frac{1}{N+1}$$
$$P_1 = 1 - \frac{2}{N+1}$$
$$P_2 = 1 - \frac{3}{N+1}$$
$$\vdots$$
$$P_N = 1 - \frac{N+1}{N+1} = 0$$

Or shorter:

$$P_n = 1 - \frac{n+1}{N+1} \quad (1)$$

where n∈[0, ... N], N+1 is the number of dedicated RNTIs and $P_N=0$ means that the cell is completely barred.

As another example, the following values could be associated with the probability parameters:

$$P_n = \frac{1}{2^{n+1}} \text{ where } n \in [0, \dots, N]. \quad (2)$$

Another way to associate access restriction levels, such as access allowance probabilities, with the dedicated user equipment identifiers, such as RNTIs, may be to let the RNTIs indicate a certain number of last bits of the system frame number (SFN) that must match the same number of last bits in a certain identity of the UE in order for the UE to be allowed to access the cell during a certain SFN. The UE identity to compare with the SFN bits may e.g. be the International Mobile Subscriber Identity (IMSI), the C-RNTI, the International Mobile Equipment Identity (IEMI) or a temporary identity assigned by the core network, e.g. the Globally Unique Temporary Identity (GUTI). For instance, the L-RNTI may indicate that 1 matching bit is required, L-RNTI+1 could indicate 2 matching bits, L-RNTI+2 could indicate 3 matching bits, etc.

In a second set of embodiments, the access restriction information is indicative of that the downlink control information, i.e. the so called payload of the DCI message, comprises further access restriction information, such as an access restriction level for use by the user equipment 120 when restricting a sending of an access request to the radio network node 110. This means that after the user equipment has decoded the DCI message, the user equipment may interpret the formatted information constituting the DCI in order to obtain an access restriction level if desired.

The second set of embodiments may be realized by redefining an existing format for the DCI or by specifying a new format for the DCI. In this manner, it is sufficient that one user equipment identifier is associated to the access restriction information. As will be understood from the following description of embodiments, it is still possible to associate more than one user equipment identifier with respective access restriction information to obtain further advantages, such as being able to set different access restriction levels to different subscriber categories, or types of user equipments. This is explained in conjunction with the third set of embodiment below.

A new DCI format may include access restriction information, i.e. DCI with a new kind of content. As mentioned earlier, the access restriction information may indicate many different items, such as radio resource, type of user equipment, access restriction level and more. The new DCI format may include one or more of the items that may be associated to the access restriction information. It may though be noted that it may not be preferred to duplicate information. For example, duplicating of information may occur if a user equipment identifier is associated to access restriction information, being indicative of a specific access restriction level to be used by the user equipment and being indicative of that further access restriction information is indicated elsewhere, such as in the downlink control information. Thus, if in this case the new DCI format also specifies an access restriction level, there will be a duplication of information.

The new DCI format, or DCI with a new kind of content, may be indicated by the size of the DCI, which may be different from existing DCI formats. Alternatively, the new DCI format may be allowed to have the same size as one existing format. In such case, the new DCI format may be distinguished from the other equal-sized DCI format through a dedicated user equipment identifier, being associated to access restriction information indicating that further access restriction information is indicated by the DCI. Such dedicated user equipment may be a dedicated access allowance probability RNTI. Alternatively or additionally, an indicator flag in the DCI may be used to distinguish the new DCI format from existing formats of equal size. Use of the indicator flag in the DCI may require that the other equal-sized DCI format is re-specified to include this flag.

The new DCI format may comprise at least the access allowance probability to apply. The access allowance probability may be set, by the eNB, between 0 and 1 or to one of a preconfigured set of possible values indicated by a number for each of the values in the set. The access allowance probability is an example of an access restriction level.

As an example, it may be possible to include ACB information in the new DCI format, similar to the ACB information in the SI. The ACB information, provided by means of the DCI, may temporarily override the ACB information in the SI or serve as an early delivery of changed or soon to be changed ACB information in the SI.

The second set of embodiments may be combined with the first set of embodiments. As an example, the first set of embodiments may be used until it is detected that only a few number of user equipment identifiers, e.g. below some threshold value, remains. The total number of user equipment identifiers is limited by the number of bits used for the user equipment identifier. Thus, when only few user equipment identifiers remain, the second set of embodiments will be used for some set of user equipments which may need dedicated access restriction information. As another example, if it is detected that the number of false detections of the user equipment identifier is high, for example above some threshold vale, it may be advantageous to use the second set of embodiments instead of some or all the access restriction information provided by means of the first set of embodiments.

In a third set of embodiments, said at least one user equipment 120 is of a first type or a second type and the access restriction information is indicative of the first or second type. In this manner, it is made possible to assign different access restriction information to different types of user equipments. The type of a user equipment may be determined based on subscription information, services to be accessed by the user equipment, capabilities of the user equipment and/or the like. The subscription information may be indicative of gold, silver etc subscribers. The service may be differentiated by required quality of service, type of service and/or other. The type of service may be voice-, data- or other similar type of service. Capabilities may indicate certain supported features or protocol versions. User equipment capability signalling to the network may also comprise such property descriptions as distinctions between handheld and non-handheld devices, smartphones, laptops, laptop dongles, low power nodes, etc.

As an example, the third set of embodiments may be realized by associating a first subset of user equipment identifiers of the set with said at least one user equipment 120 when said at least one user equipment 120 is of the first type. Furthermore, a second subset of user equipment identifiers of the set are associated with said at least one user equipment 120 when said at least one user equipment 120 is of the second type. Each user equipment identifier of the second subset is different from each user equipment identifier of the first subset. Thus, to set the access restriction level for a user equipment of the first type, one of the user equipment identifiers from the first subset is selected for use when encoding the downlink control information message. It may be noted that each user equipment identifier is associated to a specific access restriction level and to a specific type of user equipment in this example.

As another example, the third set of embodiments may be realized by allowing the new format, mentioned in conjunction with the second set of embodiments above, to indicate for which type of user equipment the access restriction information is to be applied for.

As still another example, to allow the radio network node, such as an eNB, to direct the access restriction information towards a certain subset of the UEs, there may be multiple sets of dedicated RNTIs, where each set would apply to a certain subset of the UEs. The subsets of UEs could be defined e.g. as certain categories of UEs, such as laptop integrated circuits or dongles, handhelds, smartphones etc. The differentiation could also be based on subscriber categories, e.g. restricting the access allowance probability for bronze subscribers while giving gold subscribers unrestricted access or limiting the access allowance probability only for high quota users or users who have exceeded, or almost exceeded, their basic quota. It shall be noted that quota refers to amount of data sent by the subscriber or user equipment. It would also be possible to reuse ACs (i.e. different sets of RNTIs targeting different ACs). Hence, the access allowance probability signaling could be used both for load control and service/UE category/subscriber differentiation or a combination of those.

The mapping between type of user equipment, such as subscriber or UE category, and dedicated RNTI sets may be standardized, preconfigured in the USIM or announced in the SI. Arbitrary UE subsets could be configured and mapped to RNTI sets via RRC signalling. If preconfiguration in the USIM is used, the information can only be used when accessing the home public land mobile network (HPLMN), but not when roaming in a visited public land mobile network (VPLMN).

As has been explained above, the third set of embodiment may be combined with the first and/or second set of embodiments.

In a fourth set of embodiments, the access restriction information is indicative of a specific radio resource or a specific category of resources. The specific radio resource may pertain to a certain subset of category of radio resources, such as an uplink resource intended for contention based data transmission or a random access resource, e.g. on the Physical Random Access Channel (PRACH).

The specific radio resource may be indicated by the downlink control information, when the access restriction information at least indicates that further access restriction information may be found in e.g. the DCI, or by associating the user equipment identifier to the specific radio resource. Hence, in some examples, a DCI message, including an uplink grant, may be encoded with a user equipment identifier associated with the specific radio resource. Moreover, in some examples, a DCI message may be encoded with a user equipment identifier indicating that further access restriction information may be found in the DCI, which in this example comprises information about the specific radio resource. Thus, the new DCI format may indicate a certain category of resources or a specific radio resource that the access restriction information is applicable to. The certain category of resources may be PRACH, CB resources or the like.

The specific radio resource may comprise an uplink radio resource and wherein the downlink control information comprises an uplink grant indicative of uplink scheduling information for the uplink radio resource. The user equipment may then be configured to interpret the user equipment identifier of the DCI message carrying the UL grant as an access restriction level for the scheduled resource.

The new DCI format may also comprise an UL grant which scheduled the concerned resource. The user equipment may then be configured to interpret the user equipment identifier of the DCI message carrying the UL grant as an access restriction level for the scheduled resource or to interpret the user equipment identifier as an indication of that further access restriction information, e.g. information about an access restriction level, is encoded in the DCI.

In some embodiments, the specific radio resource comprises a contention based resource and/or a random access resource.

As an example, when the radio resource comprises a contention based resource, the access restriction information to be provided to the user equipment 120 may be valid for the contention based resource until an expiry of the access restriction information. The expiry of the access restriction information will be explained further below.

In a further embodiment, the access restriction information pertains only to CB resources. To achieve control of the load on the CB resources, a dedicated set of RNTIs can be used in conjunction with the scheduling of the CB resources on PDCCH. That is, if an uplink grant of a specific CB resource on the PDCCH implicitly comprises one of the dedicated RNTIs, then a UE aspiring to use the scheduled CB resource is to apply the access restriction information indicated by the dedicated RNTI before attempting to access the specific CB resource. The radio network node 110 may use a different RNTI for each CB uplink grant. In addition to the dedicated RNTIs for access restriction information, there may be at least one RNTI to be used for regular CB resource scheduling, i.e. for CB resources for which there are no associated access restriction information. Alternatively, one of the dedicated RNTIs may be associated to access restriction information indicating an access restriction level of zero, i.e. a probability of allowing access attempts is equal to one.

The fourth set of embodiments may be combined with one or more of the embodiments from the first, second and third set of embodiments.

Action 205

The radio network node 110 sends and the user equipment 120 receives the downlink control information message. In this manner, the access restriction information is provided to said at least one user equipment 120.

Action 206

The user equipment 120 decodes the downlink control information message to obtain the user equipment identifier associated with the access restriction information. Thereby, the access restriction information is obtained.

As mentioned, in some embodiments, the access restriction information may be indicative of a specific access restriction level to be used by the user equipment, that the user equipment shall increase or decrease its current access restriction level, a cell of the radio network node for which access restrictions is to be applied, a specific radio resource relating to the cell for which access restrictions is to be applied, a type of user equipment for which access restriction is to be applied, that one or more of the preceding items is/are indicated elsewhere, such as in the downlink control information, or a combination thereof.

In some embodiments, the decoded access restriction information is indicative of an access restriction level to be applied in action 207.

In some embodiments, the user equipment may interpret the downlink control information in order to obtain an access restriction level to be applied in action 207. This is the case when the access restriction information indicates that further access restriction information may be found in for example the DCI.

The access restriction information encoded in action 204 may be decoded by the user equipment in action 206.

Action 207

In some embodiments, the user equipment 120 sends and the radio network node 110 receives, with a probability given by one of the respective access restriction levels or the access restriction level, an access request.

As an example, the user equipment 120 sends an access request or data transmission attempt to the radio network node 110 when a random number, generated by the user equipment 120, relates to the access restriction level as given by a condition (and provided that the user equipment 120 has data to send). The data transmission attempt may, as an example, be that the user equipment sends uplink data in case contention based access is allowed. A message about uplink data may comprise at least one of the access request, the data transmission and the uplink data. The condition may be that the random number is above or below the access restriction level. Thus, as another example, if the user equipment 120 has data to send, it sends an access request or data transmission attempt to the radio network node 110 when a random number, generated by the user equipment 120, is above or below the access restriction level.

In some embodiments, the access restriction information is valid during a first time period, or a validity time. As an example, the access restriction level indicated by the user equipment identifier may be valid for a limited time period, unless overridden by subsequent access restriction information provided by the radio network node 110 before the limited time period has passed. The limited time period may be standardized, preconfigured in the USIM, announced in the SI or configured in the UE via dedicated RRC signalling.

In some embodiments, the first time period may even be specified in the DCI with the above mentioned new DCI format, which DCI was comprised in a DCI message encoded with the user equipment identifier. As an example, the downlink control information may also comprise a validity time and/or the back-off time. In this context the back-off time refers to the time the user equipment must wait before it may attempt to send a new access request or data transmission after having refrained from sending an access request or data transmission due to applying the access restriction as indicated by the received access restriction information. That is, if the user equipment has data to send, but after applying the access restriction information, e.g. using the above described random number generation procedure, decides to refrain from sending this data or an access request pertaining to this data, then the user equipment must wait a time period equal to the back-off time before it may attempt to send the access request or data the next time. And this next time the user equipment should typically again apply the access restriction information to determine whether or not to proceed to send the access request. In other words, after refraining from sending an access request or data transmission, as a result of applying the access restriction information, the user equipment should consider the cell or indicated resource or type of resource as barred for a time period equal to the back-off time.

Hence, when the radio network node 110 determines that the traffic or access load is so high that it wants to restrict further access to the cell C1, the radio network node 110 signals the chosen access restriction information on the PDCCH, using one of the dedicated user equipment identifiers. Similarly, if the radio network node 110 wants to change currently valid access restriction information or extend the validity time of current access restriction information, it indicates this with an appropriate user equipment identifier on the PDCCH.

In some embodiments, the first time period is predetermined, is configured in said at least one user equipment 120 via system information broadcast using radio resource control signalling, is configured in the user equipment 120 using dedicated (unicast) radio resource control signalling, is preconfigured in the subscriber identity module or universal subscriber identity module and/or is determined by the downlink control information.

In some embodiments, a method of encoding the downlink control information with the user equipment identifier is provided. The larger the number of user equipment identifiers, such as RNTIs, a user equipment 120, 140 considers as relevant, the higher the risk is that an erroneous detection of a user equipment identifier occurs. In order to prevent this, it may be possible to increase the size of the CRC value, i.e. the number of bits representing the CRC value. The CRC value with an increased size (compared to the current specification) will be referred to as an extended CRC value. Consequently, the extended CRC value may further comprise a portion of a data region of the DCI message, i.e. a portion of the payload. The data region is where formatted information is located within the DCI message. Hence, the CRC may be extended with a specified number of bits at the expense of the data region. In order to make use of the extended CRC value to decrease the risk of erroneous user equipment identifier detection, the encoding of the DCI message with the user equipment identifier, such as an RNTI, has to be extended too. One way of doing this is to perform a bitwise modulo 2 addition of the RNTI into an extended portion of the CRC value in addition to the operations explained previously in conjunction the brief description of how the DCI message is encoded according to prior art. If the size of the extended CRC value is less than twice the size of the user equipment identifier, i.e. less than 32 bits, i.e. 2×16 bits, if the user equipment identifier is an RNTI, then only a portion of the user equipment identifier, e.g. RNTI, (the same number of bits as the CRC extension) would be added to the CRC extension.

Alternatively, the user equipment identifier may be extended with the same number of bits as the CRC extension using a redundancy encoding prior to the bitwise modulo 2 addition to the extended CRC.

According to prior art, a DCI message may be transmitted on the PDCCH in any subframe. Consequently, this also applies to provision of access restriction information as disclosed herein.

However, in some embodiments, the provision of access restriction information may be restricted to certain subframes, such as every second subframe or every tenth subframe. An advantage of restricting provision of access restriction information to certain subframes may be that it is only during the certain subframes user equipments need to consider the user equipment identifiers dedicated for provision of access restriction information as relevant. In this manner, the risk for false user equipment identifier detections may be reduced.

Figure 3:
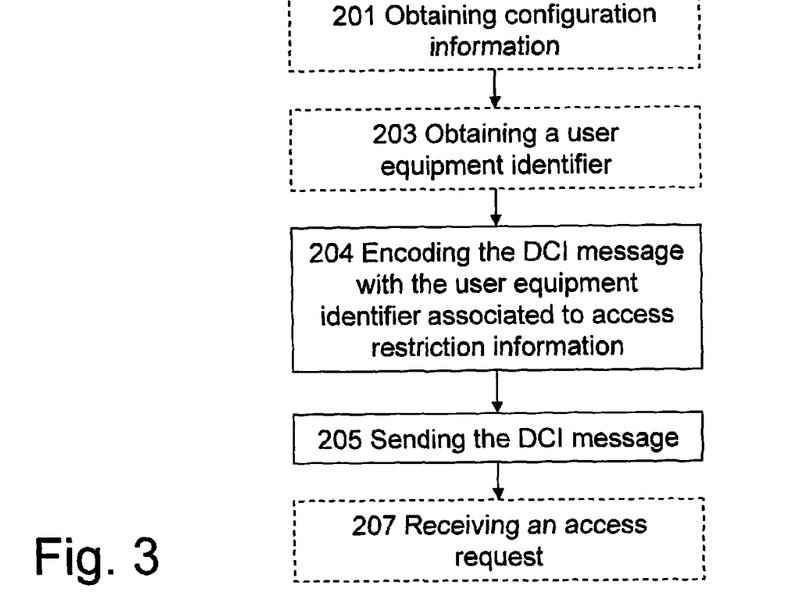
FIG. 3 shows a schematic flow chart of the method of FIG. 2 when seen from the radio network node.

In FIG. 3, there is shown an exemplifying, schematic flow chart of the method of FIG. 2 when seen from the radio network node 110. The radio network node performs a method for providing access restriction information about restricting access to a cell, managed by the radio network node 110, for at least one user equipment 120 served by the radio network node 110. Again, said at least one user equipment 120 may be located in the cell C1, i.e. the user equipment 120 is served by the radio network node 110 via the cell C1. As mentioned above, the radio network node 110 and said at least one user equipment 120 are comprised in a radio communication system.

The following steps may be performed. Notably, in some embodiments of the method the order of the steps may differ from what is indicated below.

Action 201

This action is similar to the corresponding action described in conjunction with FIG. 2.

In some embodiments of the method in the radio network node 110, the radio network node 110 obtains configuration information about the user equipment identifier and the associated access restriction information.

In some embodiments, the configuration information comprises at least one of:
 an indication of at least one user equipment identifier of the set that is associated with the access restriction information, and
 the access restriction information for association with the user equipment identifier.

In some embodiments of the method in the radio network node 110, the obtaining comprises associating the user equipment identifier with the access restriction information.

In some embodiments of the method in the radio network node 110, the obtaining comprises receiving the configuration information from a network node 130 for handling information about subscription of the user equipment 120, about user equipment context and/or about mobility of the user equipment 120. In some embodiments the network node 130 is an entity responsible for operation and maintenance (O&M) tasks, e.g. an O&M node such as an Operation Support System (OSS). In some embodiments the network node 130 providing the configuration information to the radio network node 110 is an entity for handling user plane traffic, such as a Serving Gateway (SGW).

Action 203

This action is similar to the corresponding action described in conjunction with FIG. 2.

In some embodiments of the method in the radio network node 110, prior to using the user equipment identifier associated with access restriction information to encode the downlink control information message, the radio network node 110 obtains the user equipment identifier.

In some embodiments of the method in the radio network node 110, the radio network node 110 obtains the user equipment identifier in that the radio network node 110 determines the user equipment identifier based on load on the radio network node.

In some embodiments of the method in the radio network node 110, the radio network node 110 obtains the user equipment identifier in that the radio network node 110 receives the user equipment identifier from the network node 130.

Action 204

This action is similar to the corresponding action described in conjunction with FIG. 2.

The radio network node 110 encodes the downlink control information message by using a user equipment identifier associated with the access restriction information.

Action 205

This action is similar to the corresponding action described in conjunction with FIG. 2.

The radio network node 110 sends the downlink control information to said at least one user equipment 120, thereby providing the access restriction information to said at least one user equipment 120.

Action 207

This action is similar to the corresponding action described in conjunction with FIG. 2.

In some embodiments of the method in the radio network node 110, the radio network node 110 receives an access request or data transmission from a user equipment 120. An example of data transmission may be uplink data. The request is sent by the user equipment 120 while taking the access restriction information into account.

In some embodiments of the method in the radio network node 110, the user equipment identifier is comprised in a set of user equipment identifiers. Each user equipment identifier of the set is associated with access restriction information.

In some embodiments of the method in the radio network node 110, a first number of user equipment identifiers of the set are associated with respective access restriction levels comprised in the access restriction information, thereby enabling the user equipment 120 to restrict a sending of an access request or data transmission to the radio network node 110 by means of one of the respective access restriction levels.

In some embodiments of the method in the radio network node 110, said at least one user equipment 120 is of a first type or a second type. A first subset of user equipment identifiers of the set are associated with said at least one user equipment 120 when said at least one user equipment 120 is of the first type. A second subset of user equipment identifiers of the set are associated with said at least one user equipment 120 when said at least one user equipment 120 is of the second type. Each user equipment identifier of the second subset is different from each user equipment identifier of the first subset.

In some embodiments of the method in the radio network node 110, the downlink control information message comprises downlink control information comprising an access restriction level for use by the user equipment 120 when restricting a sending of an access request or data transmission to the radio network node 110.

In some embodiments of the method in the radio network node 110, the access restriction information is valid for access to a specific radio resource.

In some embodiments of the method in the radio network node 110, the specific radio resource is indicated by the downlink control information.

In some embodiments of the method in the radio network node 110, the specific radio resource comprises an uplink radio resource and wherein the downlink control information comprises an uplink grant indicative of scheduling information for the uplink radio resource.

In some embodiments of the method in the radio network node 110, the resource comprises a contention based resource and/or a random access resource.

In some embodiments of the method in the radio network node 110, the access restriction information is valid during a first time period.

In some embodiments of the method in the radio network node 110, the first time period is predetermined, is configured in said at least one user equipment 120 via system information broadcast using radio resource control signalling, is configured in the at least one user equipment using dedicated (unicast) radio resource signalling, is preconfigured in the subscriber identity module or universal subscriber identity module and/or is determined by the downlink control information.

In some embodiments of the method in the radio network node 110, the radio network node 110 is a radio base station and the radio communication system is a Long Term Evolution system.

In some embodiments of the method in the radio network node 110, the user equipment identifier is a radio network temporary identifier, RNTI.

Figure 4:
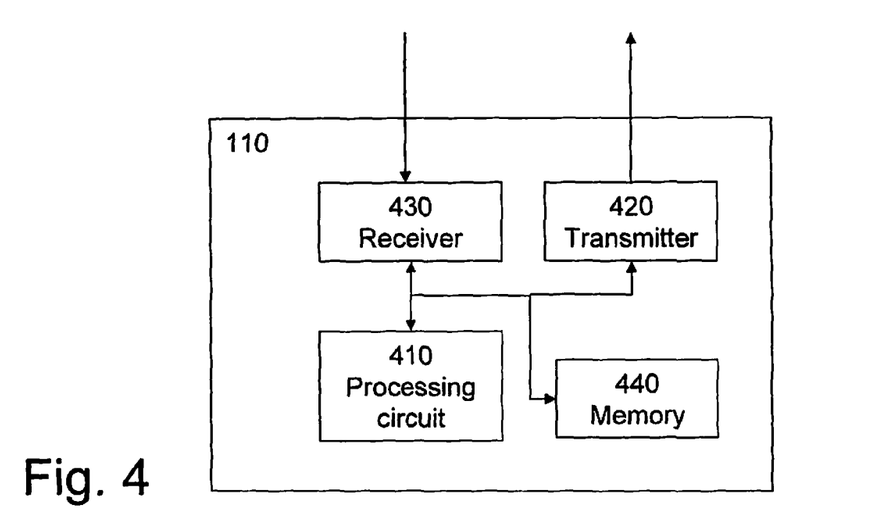
FIG. 4 shows a schematic block diagram of an exemplifying radio network node configured to perform the method illustrated in FIG. 3.

With reference to FIG. 4, there is shown a schematic block diagram of an exemplifying radio network node 110 configured to perform the actions above for providing access restriction information to the user equipment 120. As mentioned above, the access restriction information relates to restriction of access to a cell C1. The radio network node is capable of managing the cell C1 and is also capable of serving at least one user equipment 120.

The radio network node 110 comprises a processing circuit 410 configured to encode the downlink control information message by using a user equipment identifier associated with the access restriction information. The processing circuit 410 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments of the radio network node 110, the processing circuit 410 is configured to obtain configuration information about the user equipment identifier and the associated access restriction information.

In some embodiments, the configuration information comprises at least one of:
  an indication of at least one user equipment identifier of the set that is associated with the access restriction information, and
  the access restriction information for association with the user equipment identifier.

In some embodiments of the radio network node 110, the processing circuit 410 is further configured to associate the user equipment identifier with the access restriction information.

In some embodiments of the radio network node 110, the processing circuit 410 is configured to obtain the user equipment identifier.

In some embodiments of the radio network node 110, the processing circuit 410 is configured to determine the user equipment identifier based on load on the radio network node.

Furthermore, the radio network node 110 comprises a transmitter 420 configured to send the downlink control information message to said at least one user equipment 120, whereby the radio network node 110 is enabled to provide the access restriction information to said at least one user equipment 120.

In some embodiments of the radio network node 110, the radio network node further comprises a receiver 430 configured to receive the configuration information from a network node 130 for handling information about subscription of the user equipment 120, about user equipment context and/or about mobility of the user equipment 120. The network node 130 may also be an entity responsible for operation and maintenance (O&M) tasks, e.g. an O&M node such as an Operation Support System (OSS) or an entity for handling user plane traffic, such as a Serving Gateway (SGW).

In some embodiments of the radio network node 110, the receiver 430 is configured to receive the user equipment identifier from the network node 130.

In some embodiments of the radio network node 110, the radio network node 110 may further comprise a memory 440 for storing software to be executed by, for example, the processing circuit. The software may comprise instructions to enable the processing circuit to perform the method in the radio network node 110 as described above in conjunction with FIG. 3. The memory 440 may be a hard disk, a magnetic storage medium, a portable computer diskette or disc, flash memory, random access memory (RAM), a portion of a subscriber identity module (SIM) or universal subscriber identity module (USIM), a SIM card, a universal integrated circuit card (UICC) or the like. Furthermore, the memory may be an internal register memory of a processor.

In some embodiments of the radio network node 110, the memory 440, such as a SIM or universal SIM (USIM), is used for storing of dedicated user equipment identifiers reserved for indication of access restriction information.

In some embodiments of the radio network node 110, the user equipment identifier is comprised in a set of user equipment identifiers. Each user equipment identifier of the set is associated with the access restriction information.

In some embodiments of the radio network node 110, a first number of user equipment identifiers of the set are associated with respective access restriction levels comprised in the access restriction information, thereby enabling the user equipment 120 to restrict a sending of an access request or data transmission to the radio network node 110 by means of one of the respective access restriction levels.

In some embodiments of the radio network node 110, the downlink control information message comprises downlink control information comprising an access restriction level for use by the user equipment 120 when restricting a sending of an access request or data transmission to the radio network node 110.

In some embodiments of the radio network node 110, the access restriction information is valid for access to a specific radio resource.

In some embodiments of the radio network node 110, the specific radio resource is indicated by the downlink control information.

In some embodiments of the radio network node 110, the specific radio resource comprises an uplink radio resource and wherein the downlink control information comprises an uplink grant indicative of scheduling information for the uplink radio resource.

In some embodiments of the radio network node 110, the resource comprises a contention based resource and/or a random access resource.

In some embodiments of the radio network node 110, the access restriction information is valid during a first time period.

In some embodiments of the radio network node 110, the first time period is predetermined, is configured in said at least one user equipment 120 via system information broadcast using radio resource control signalling, is configured in said at least one user equipment 120 via dedicated (unicast) radio resource signalling, is preconfigured in the subscriber identity module or universal subscriber identity module and/or is determined by the downlink control information.

In some embodiments of the radio network node 110, the radio network node 110 is a radio base station, such as an eNB.

Figure 5:
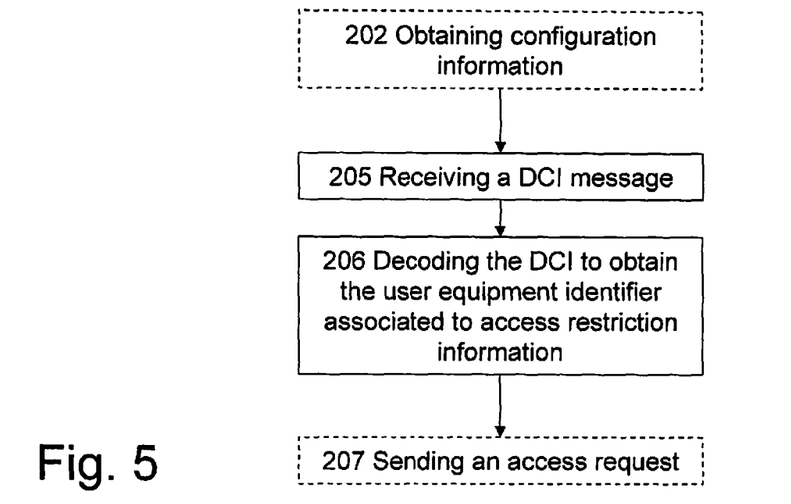
FIG. 5 shows a schematic flow chart of the method of FIG. 2 when seen from the user equipment.

Referring to FIG. 5, there is shown an exemplifying, schematic flow chart of the method of FIG. 2 when seen from the user equipment 120. The user equipment 120 performs a method for obtaining access restriction information about restricting access to a cell, managed by a radio network node 110, for the user equipment 120 being served by the radio network node 110. Again, said at least one user equipment 120 may be located in the cell C1, i.e. the user equipment 120 is served by the radio network node 110 via the cell C1. As mentioned above, the user equipment 120 and the radio network node 110 are comprised in a radio communication system.

In some embodiments of the method in the user equipment 120, a first number of user equipment identifiers of the set are associated with respective access restriction levels comprised in the access restriction information.

In some embodiments of the method in the user equipment 120, the downlink control information message comprises downlink control information comprising information about an access restriction level.

The following steps may be performed. Notably, in some embodiments of the method the order of the steps may differ from what is indicated below.

Action 202

This action is similar to the corresponding action described in conjunction with FIG. 2.

In some embodiments of the method in the user equipment 120, the user equipment 120 obtains configuration information about the user equipment identifier and the associated access restriction information. The configuration information indicates at least one user equipment identifier of the set that is associated with the access restriction information.

In some embodiments of the method in the user equipment 120, the user equipment 120 obtains the configuration information in that the user equipment 120 receives the configuration information from the radio network node 110.

Action 205

This action is similar to the corresponding action described in conjunction with FIG. 2.

The user equipment 120 receives a downlink control information message from the radio network node 110.

Action 206

This action is similar to the corresponding action described in conjunction with FIG. 2.

The user equipment 120 decodes the downlink control information message to obtain a user equipment identifier associated with the access restriction information, thereby obtaining the access restriction information.

In some embodiments of the method in the user equipment 120, the user equipment identifier is comprised in a set of user equipment identifiers. Each user equipment identifier of the set is associated with the access restriction information.

Action 207

This action is similar to the corresponding action described in conjunction with FIG. 2.

In some embodiments of the method in the user equipment 120, if the user equipment 120 has data to send, it sends an access request or uplink data to the radio network node 110 with a probability given by one of the respective access restriction levels or the access restriction level, i.e. directly or indirectly given by the access restriction information. When the probability is directly given by the access restriction information, the access restriction information is indicative of an access restriction level. When the probability is indirectly given by the access restriction information, the access restriction information indicates that further access restriction information may be found in for example the downlink control information.

In some embodiments of the method in the user equipment 120, the user equipment 120 is of a first type or a second type. A first subset of user equipment identifiers of the set are associated with the user equipment 120 when the user equipment 120 is of the first type. A second subset of user equipment identifiers of the set are associated with the user equipment 120 when the user equipment 120 is of the second type. Each user equipment identifier of the second subset is different from each user equipment identifier of the first subset.

In some embodiments of the method in the user equipment 120, the access restriction information is valid for access to a specific radio resource.

In some embodiments of the method in the user equipment 120, the specific radio resource is indicated by the downlink control information.

In some embodiments of the method in the user equipment 120, the specific radio resource comprises an uplink radio resource and wherein the downlink control information comprises an uplink grant indicative of scheduling information for the uplink radio resource.

In some embodiments of the method in the user equipment 120, the specific radio resource comprises a contention based resource and/or a random access resource.

In some embodiments of the method in the user equipment 120, the access restriction information is valid during a first time period.

In some embodiments of the method in the user equipment 120, the first time period is predetermined, is configured in said at least one user equipment 120 via system information broadcast using radio resource control signalling, is configured in said at least one user equipment 120 using dedicated (unicast) radio resource signalling, is preconfigured in the subscriber identity module or universal subscriber identity module and/or is determined by the downlink control information.

In some embodiments of the method in the user equipment 120, the radio network node 110 is a radio base station and the radio communication system is a Long Term Evolution system.

In some embodiments of the method in the user equipment 120, the user equipment identifier is a radio network temporary identifier, RNTI.

Figure 6:
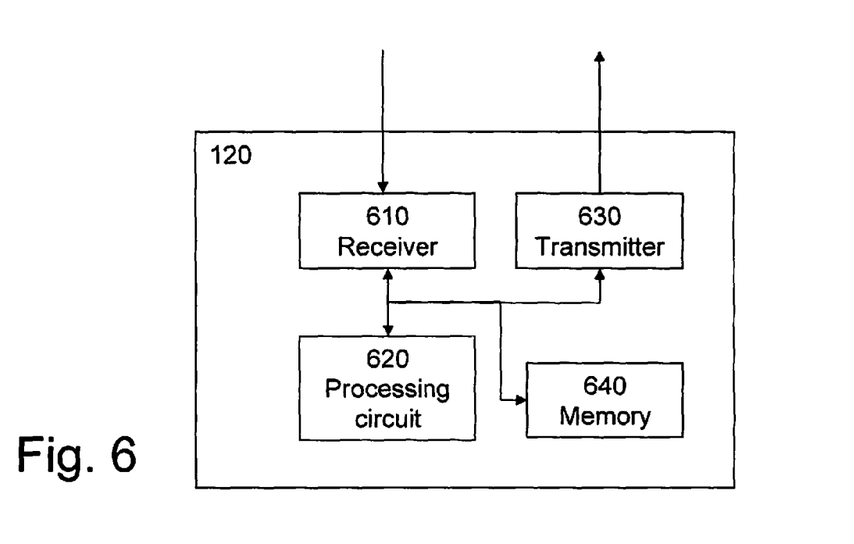
FIG. 6 shows a schematic block diagram of an exemplifying user equipment configured to perform the method illustrated in FIG. 5.

FIG. 6 shows a schematic block diagram of an exemplifying user equipment 120 configured to perform the method illustrated in FIG. 5. As mentioned above, the access restriction information relates to restricting access to a cell for the user equipment 120 servable by the radio network node 110. The radio network node 110 is capable of managing the cell.

The user equipment 120 comprises a receiver 610 configured to receive the downlink control information message from the radio network node 110.

In some embodiments of the user equipment 120, the receiver 630 is configured to receive the configuration information from the radio network node 110.

In some embodiments of the user equipment 120, the downlink control information message comprises downlink control information comprising an access restriction level.

Furthermore, the user equipment 120 comprises a processing circuit 620 configured to decode the downlink control information message to obtain a user equipment identifier associated with the access restriction information.

The processing circuit 620 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments of the user equipment 120, the processing circuit 620 is configured to obtain configuration information about the user equipment identifier and the associated access restriction information. The configuration information indicates at least one user equipment identifier of the set that is associated with the access restriction information.

In some embodiments of the user equipment 120, a first number of user equipment identifiers of the set are associated with respective access restriction levels comprised in the access restriction information.

In some embodiments of the user equipment 120, the user equipment 120 further comprises a transmitter 630 configured to, if the user equipment 120 has data to send, send an access request or uplink data to the radio network node 110 with a probability given by one of the respective access restriction levels or the access restriction level, i.e. directly or indirectly given by the access restriction information. When the probability is directly given by the access restriction information, the access restriction information is indicative of an access restriction level. When the probability is indirectly given by the access restriction information, the access restriction information indicates that further access restriction information may be found in for example the downlink control information.

In some embodiments of the user equipment 120, the user equipment 120 may further comprise a memory 640 for storing software to be executed by, for example, the processing circuit. The software may comprise instructions to enable the processing circuit to perform the method in the user equipment 120 as described above in conjunction with FIG. 5. The memory 640 may be a hard disk, a magnetic storage medium, a portable computer diskette or disc, Flash memory, random access memory (RAM), a portion of a subscriber identity module (SIM) or universal subscriber identity module (USIM), a SIM card, a universal integrated circuit card (UICC) or the like. Furthermore, the memory may be an internal register memory of a processor.

In some embodiments of the user equipment 120, the user equipment identifier is comprised in a set of user equipment identifiers. Each user equipment identifier of the set is associated with the access restriction information.

In some embodiments of the user equipment 120, the user equipment 120 is of a first type or a second type. A first subset of user equipment identifiers of the set are associated with the user equipment 120 when the user equipment 120 is of the first type. A second subset of user equipment identifiers of the set are associated with the user equipment 120 when the user equipment 120 is of the second type. Each user equipment identifier of the second subset is different from each user equipment identifier of the first subset.

In some embodiments of the user equipment 120, the access restriction information is valid for access to a specific radio resource.

In some embodiments of the method in the user equipment 120, the specific radio resource is indicated by the downlink control information.

In some embodiments of the user equipment 120, the specific radio resource comprises an uplink radio resource and wherein the downlink control information comprises an uplink grant indicative of scheduling information for the uplink radio resource.

In some embodiments of the user equipment 120, the specific radio resource comprises a contention based resource and/or a random access resource.

In some embodiments of the user equipment 120, the access restriction information is valid during a first time period.

In some embodiments of the user equipment 120, the first time period is predetermined, is configured in said at least one user equipment 120 via system information broadcast using radio resource control signalling, is configured in said at least one user equipment 120 using dedicated (unicast) radio resource signalling, is preconfigured in the subscriber identity module or universal subscriber identity module and/or is determined by the downlink control information.

Even though embodiments of the various aspects have been described, many different alterations, modifications and the like thereof will become apparent for those skilled in the art. The described embodiments are therefore not intended to limit the scope of the present disclosure.

The invention claimed is:

1. A method in a radio network node for providing access restriction information about restricting access to a cell, managed by the radio network node, for a user equipment served by the radio network node, wherein the radio network node and the user equipment are comprised in a radio communication system, and wherein the method comprises:
    encoding a downlink control information message by using a user equipment identifier associated with the access restriction information, wherein the access restriction information indicates an access restriction probability level to be used by the user equipment when deciding whether or not to send an access request to the radio network node, and wherein the user equipment identifier indicates the access restriction probability level; and
    sending the downlink control information message to the user equipment, thereby providing the access restriction information to the user equipment.

2. The method in the radio network node according to claim 1, wherein the user equipment identifier is comprised in a set of user equipment identifiers, wherein each user equipment identifier of the set is associated with the access restriction information.

3. The method in the radio network node according to claim 2, further comprising:
    obtaining configuration information, wherein the configuration information comprises at least one of:
        an indication of at least one user equipment identifier of the set that is associated with the access restriction information, and
        the access restriction information for association with the user equipment identifier.

4. The method in the radio network node according to claim 3, wherein the obtaining comprises associating the user equipment identifier with the access restriction information.

5. The method in the radio network node according to claim 3, wherein the obtaining comprises receiving the configuration information from a network node for handling information about node configuration and operation and maintenance tasks, about subscription of the user equipment, about user equipment context and/or about mobility of the user equipment.

6. The method in the radio network node according to claim 2, wherein the user equipment is of a first type or a second type, wherein
    a first subset of user equipment identifiers of the set are associated with the user equipment when the user equipment is of the first type, and
    a second subset of user equipment identifiers of the set are associated with the user equipment when the user equipment is of the second type, wherein each user equipment identifier of the second subset is different from each user equipment identifier of the first subset.

7. The method in the radio network node according to claim 2, wherein a first number of user equipment identifiers of the set are associated with respective access restriction levels comprised in the access restriction information, thereby enabling the user equipment to restrict a sending of an access request to the radio network node by means of one of the respective access restriction levels.

8. The method in the radio network node according to claim 1, further comprising:
    obtaining the user equipment identifier.

9. The method in the radio network node according to claim 8, wherein the obtaining comprises determining the user equipment identifier based on load on the radio network node.

10. The method in the radio network node according to claim 8, wherein the obtaining comprises receiving the user equipment identifier from a network node for handling information about any one or more of node configuration and operation and maintenance tasks, subscription of the user equipment, user equipment context, and mobility of the user equipment.

11. The method in the radio network node according claim 1, wherein the access restriction information is valid for access to a specific radio resource.

12. The method in the radio network node according to claim 11, wherein the specific radio resource is indicated by the downlink control information, comprised in the downlink control information message.

13. The method in the radio network node according to claim 12, wherein the specific radio resource comprises an uplink radio resource and wherein the downlink control information comprises an uplink grant indicative of uplink scheduling information for the uplink radio resource.

14. The method in the radio network node according to claim 11, wherein the resource comprises at least one of a contention based resource and a random access resource.

15. The method in the radio network node according to claim 1, wherein the access restriction information is valid during a first time period.

16. The method in the radio network node according to claim 15, wherein the first time period is predetermined, is configured in the user equipment via system information broadcast using radio resource control signaling, is configured in the user equipment using signaling dedicated for the user equipment, is preconfigured in the subscriber identity module or universal subscriber identity module or is determined by the downlink control information.

17. The method in the radio network node according to claim 1, wherein the radio network node is a radio base station and the radio communication system is a Long Term Evolution system.

18. The method in the radio network node according to claim 1, wherein the user equipment identifier is a radio network temporary identifier, RNTI.

19. A radio network node for providing access restriction information about restricting access to a cell capable of being managed by the radio network node, for a user equipment servable by the radio network node, wherein the radio network node comprises:
    a processing circuit configured to encode a downlink control information message by using a user equipment identifier associated with the access restriction information, wherein the access restriction information indicates an access restriction probability level to be used by the user equipment when deciding whether or not to send an access request to the radio network node, and wherein the user equipment identifier indicates the access restriction probability level; and a transmitter configured to send the downlink control information message to the user equipment, whereby the radio network node is enabled to provide the access restriction information to the user equipment.

20. A method in a user equipment for obtaining access restriction information about restricting access to a cell managed by a radio network node, for the user equipment being served by the radio network node, wherein the user equipment and the radio network node are comprised in a radio communication system, wherein the method comprises:

obtaining configuration information about a user equipment identifier associated with the access restriction information, wherein the configuration information indicates the user equipment identifier associated with the access restriction information;

receiving a downlink control information message from the radio network node; and decoding the downlink control information message to obtain a user equipment identifier associated with the access restriction information, wherein the access restriction information indicates an access restriction probability level to be used by the user equipment when deciding whether or not to send an access request to the radio network node, and wherein the user equipment identifier indicates the access restriction probability level, thereby obtaining the access restriction information.

21. The method in the user equipment according to claim 20, wherein the user equipment identifier is comprised in a set of user equipment identifiers, wherein each user equipment identifier of the set is associated with the access restriction information.

22. The method in the user equipment according to claim 21, wherein the obtaining comprises receiving the configuration information from the radio network node.

23. The method in the user equipment according to claim 21, wherein the user equipment is of a first type or a second type, wherein a first subset of user equipment identifiers of the set are associated with the user equipment when the user equipment is of the first type, and a second subset of user equipment identifiers of the set are associated with the user equipment when the user equipment is of the second type, wherein each user equipment identifier of the second subset is different from each user equipment identifier of the first subset.

24. The method in the user equipment according to claim 21, wherein a first number of user equipment identifiers of the set are associated with respective access restriction levels comprised in the access restriction information.

25. The method in the user equipment according to claim 20, wherein the access restriction information is valid for access to a specific radio resource.

26. The method in the user equipment according to claim 25, wherein the specific radio resource is indicated by the downlink control information, comprised in the downlink control information message.

27. The method in the user equipment according to claim 26, further comprising:

when having data to send, performing an action of sending an access request or uplink data to the radio network node with a probability given by one of the respective access restriction levels or the access restriction level.

28. The method in the user equipment according to claim 26, wherein the specific radio resource comprises an uplink radio resource and wherein the downlink control information comprises an uplink grant indicative of uplink scheduling information for the uplink radio resource.

29. The method in the user equipment according to claim 25, wherein the specific radio resource comprises a contention based resource and/or a random access resource.

30. The method in the user equipment according to claim 20, wherein the access restriction information is valid during a first time period.

31. The method in the user equipment according to claim 30, wherein the first time period is predetermined, is configured in the user equipment via system information broadcast using radio resource control signaling, is configured in the user equipment using signaling dedicated for the user equipment, is preconfigured in the subscriber identity module or universal subscriber identity module or is determined by the downlink control information.

32. The method in the user equipment according to claim 20, wherein the radio network node is a radio base station and the radio communication system is a Long Term Evolution system.

33. The method in the user equipment according to claim 20, wherein the user equipment identifier is a radio network temporary identifier, RNTI.

34. A user equipment for obtaining access restriction information about restricting access to a cell, capable of being managed by a radio network node, for the user equipment servable by the radio network node, wherein the user equipment comprises:

a receiver configured to receive a downlink control information message from the radio network node; and a processing circuit configured to decode the downlink control information message to obtain a user equipment identifier associated with the access restriction information, wherein the access restriction information indicates an access restriction probability level to be used by the user equipment when deciding whether or not to send an access request to the radio network node, wherein the user equipment identifier indicates the access restriction probability level, and wherein the processing circuit is configured to obtain configuration information about the user equipment identifier and the associated access restriction information, wherein the configuration information indicates the user equipment identifier associated with the access restriction information.

* * * * *